United States Patent

[11] 3,612,876

[72] Inventor Michael P. Grant
 Columbus, Ohio
[21] Appl. No. 730,708
[22] Filed May 21, 1968
[45] Patented Oct. 12, 1971
[73] Assignee Industrial Nucleonics Corporation

[54] STANDARDIZATION SYSTEM FOR A DIGITAL RADIATION GAUGE
17 Claims, 4 Drawing Figs.

[52] U.S. Cl. .................................................... 250/83.3, 250/83
[51] Int. Cl. ........................................................ G01n 23/16
[50] Field of Search ............................................. 250/83 C, 83.3, 83.3 D

[56] References Cited
UNITED STATES PATENTS

| | | | |
|---|---|---|---|
| 2,984,746 | 5/1961 | Speh et al. | 250/83 C X |
| 3,159,746 | 12/1964 | Powell et al. | 250/83 C X |
| 3,296,438 | 1/1967 | Main | 250/83.3 X |
| 3,348,046 | 10/1967 | Lloyd | 250/83.3 D |

Primary Examiner—Archie R. Borchelt
Attorneys—Cushman, Darby & Cushman, William T. Fryer, III, C. Henry Peterson and James J. O'Reilly ABSTRACT: A system for measuring weight per unit area using a nucleonic gauge with simplified standardization circuits. In one embodiment the standardization circuitry is all digital, and in another embodiment, is partially digital. In those two embodiments and a third embodiment the standardization circuitry is operated in accordance with the count of detector output pulses occurring during a predetermined interval during a standardization time. In the latter embodiment, this digital count signal is converted to an analog signal to vary the operating point pulse rate directly and the counting time inversely. In the other two embodiments, the digital count signal is employed to set a down counter to the corresponding count, and then the counter counts down for an interval of time. In one embodiment the analog of the digital count signal is employed to determine the count down time, while another embodiment utilizes the digital count signal itself to establish that count down interval.

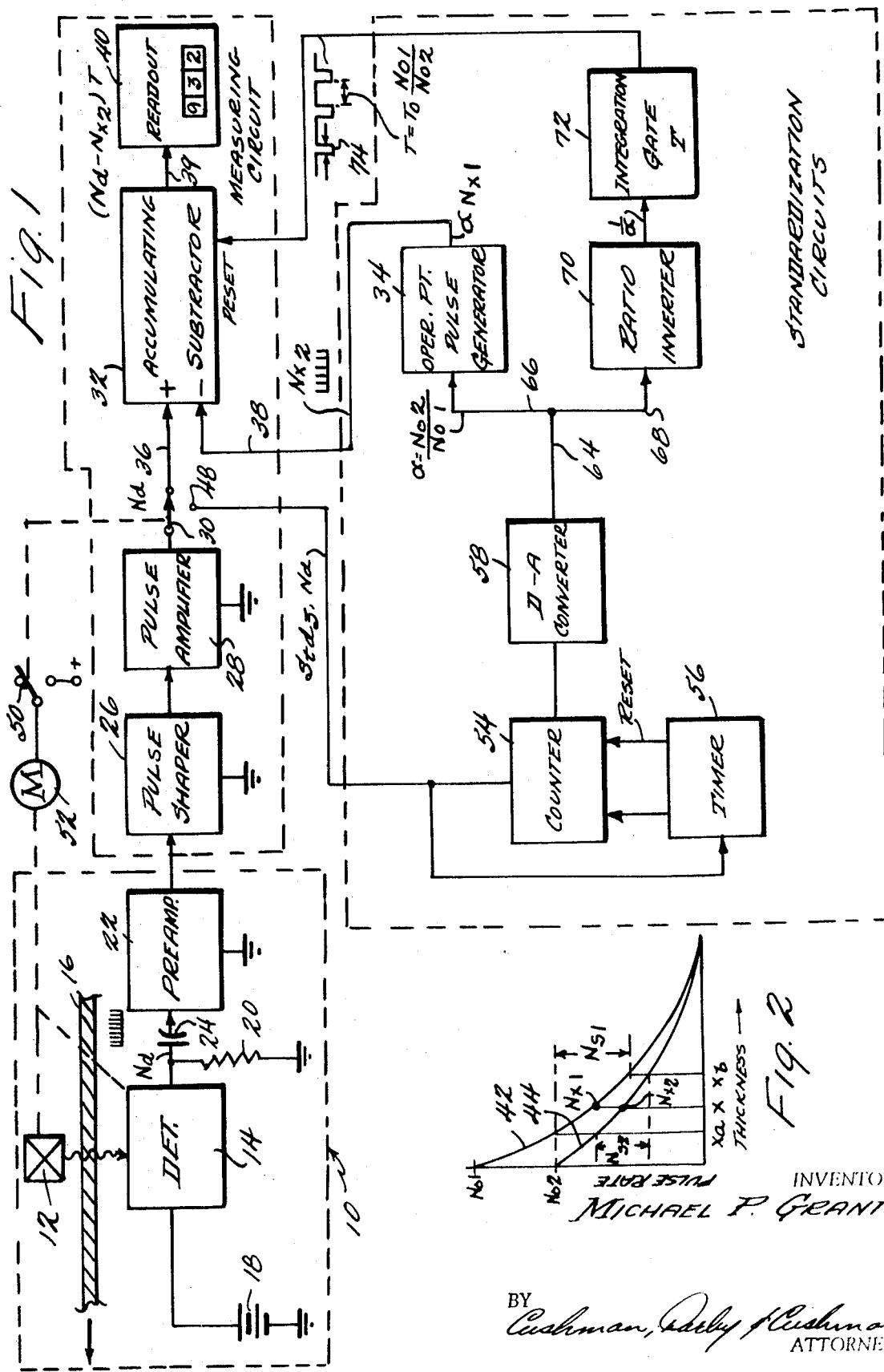

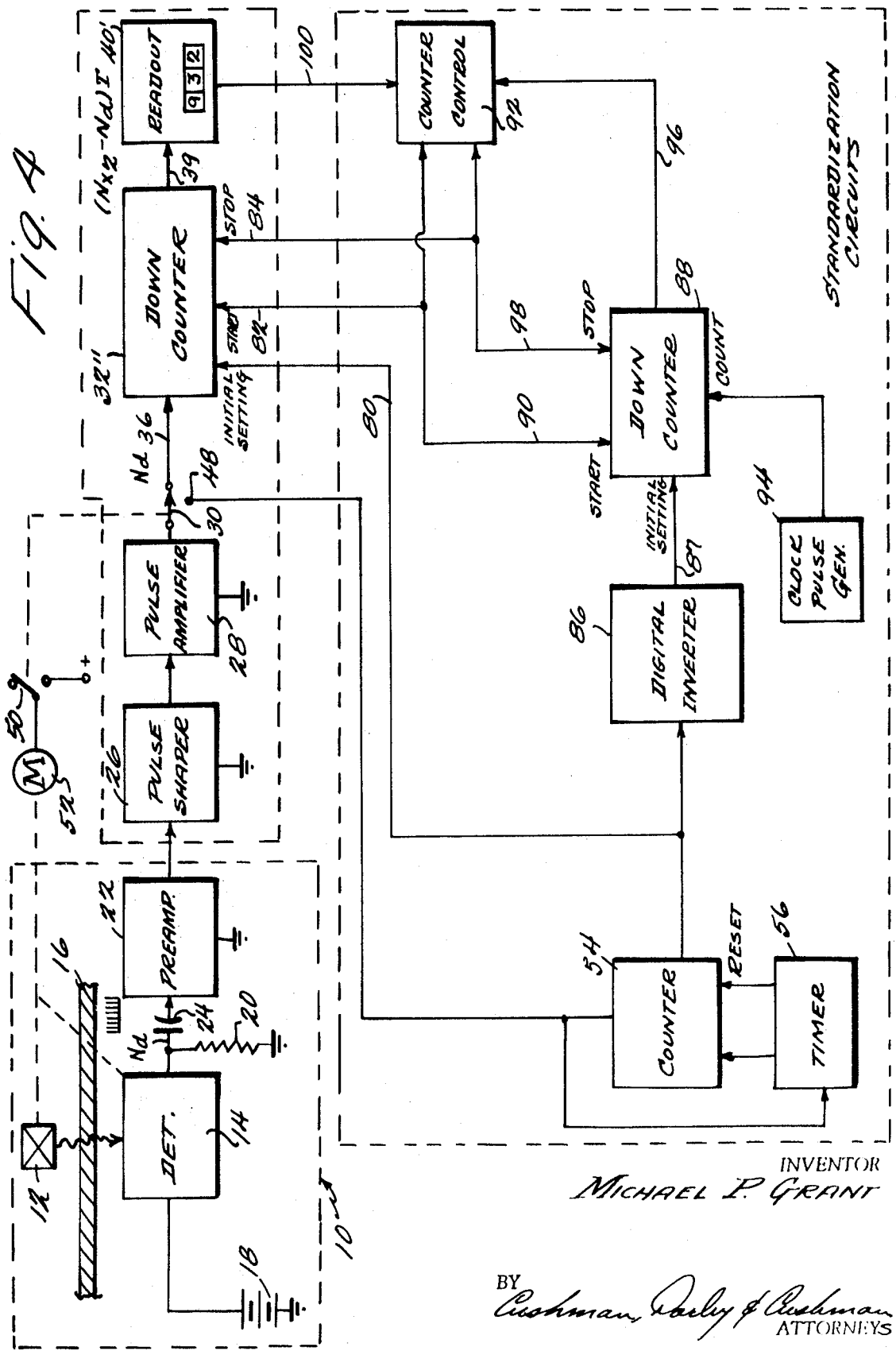

STANDARDIZATION SYSTEM FOR A DIGITAL RADIATION GAUGE

This invention relates to a measuring system, and more particularly to a nucleonic gauge for determining the weight per unit area of material which normally moves through the gauge.

As is well known, such gauges are used to measure not only weight per unit area, but thickness if the density of the material is constant, or density if the thickness of the material is constant. For convenience, the detailed description of this invention is in terms of measuring thickness of a sheet of material which passes through the gauge, but it is to be understood that no limitation is intended to measurement of thickness.

This invention concerns itself with a system which has the ability to measure and resolve individual pulses from a radiation detector which is responsive to a radiation source such as a nucleonic source, and is useful either in a transmission type of gauge in which the material being measured passes between the source and a pulse detector, or in a backscatter type of gauge in which the material being measured passes in front of both the source and detector. In either instance, the average count rate of pulses from the detector is varied in accordance with the weight per unit or area density of the absorbing material being measured.

This invention particularly relates to an improvement in the invention described and claimed in the commonly owned Chope application Ser. No. 599,128, filed June 21, 1966 now abandoned. In the standardization circuitry of that application, a memory or present frequency clock to provide a pulse rate corresponding to the initial standardization pulse rate of pulses from the detector when zero absorber is in the radiation path. Then, during subsequent standard standardizing times, pulses from the memory are counted for a predetermined interval while the current standardization pulses are also counted for that time. The resulting counts are divided by a pulse divider which provides an analog output signal for varying the operating point pulse generator rate directly and the measuring count times inversely. I have discovered, however, that the initial standardization pulse rate memory and it counter are not essential, meaning that the pulse divider is not needed either. Instead, I have found that only a count of the detector output pulses is needed during each standardization time. The pulse divider of the prior application is replaced in one embodiment by a digital to analog converter, which provides a signal for operating the pulse generator and measuring gate in the prior application.

I have further discovered that it is not necessary to have an operating point pulse generator if the measuring counter is of the down counting type. This allows the system to become all digital or at least the set circuitry to the down counter may be completely digital. That is, the digital count signal obtained during a standardization period may be employed throughout the successive measuring time to set down counter to the count represented by that signal. Then, the counter counts down the detector output pulses during each of successive time periods to obtain a standardized indication of the measure of the material passing through the gauge. If desired, the length of those successive counting periods may be controlled through a digital to analog converter as above explained, or through circuitry which is totally digital.

Under any circumstance it is the primary object of this invention to provide a measuring system of the weight per unit area type with standardization circuitry for compensating for changes in the general circuitry and environmental factors in the source-detector unit, with the count of the detector output pulses during successive standardization times being employed as the sole indication of the amount of compensation that is necessary.

Other objects of the invention in line with the preceding description thereof, and advantages thereof, will become more apparent to those of ordinary skill in the art upon reading the appended claims and the following detailed description of the invention, in conjunction with the drawings, wherein:

FIG. 1 is a block diagram of a total measuring system incorporating the present invention;

FIG. 2 is a graph showing absorption curves useful in explaining the invention;

FIG. 4 is another block diagram of a further modification of the invention in which the system is totally digital.

Figure 3:
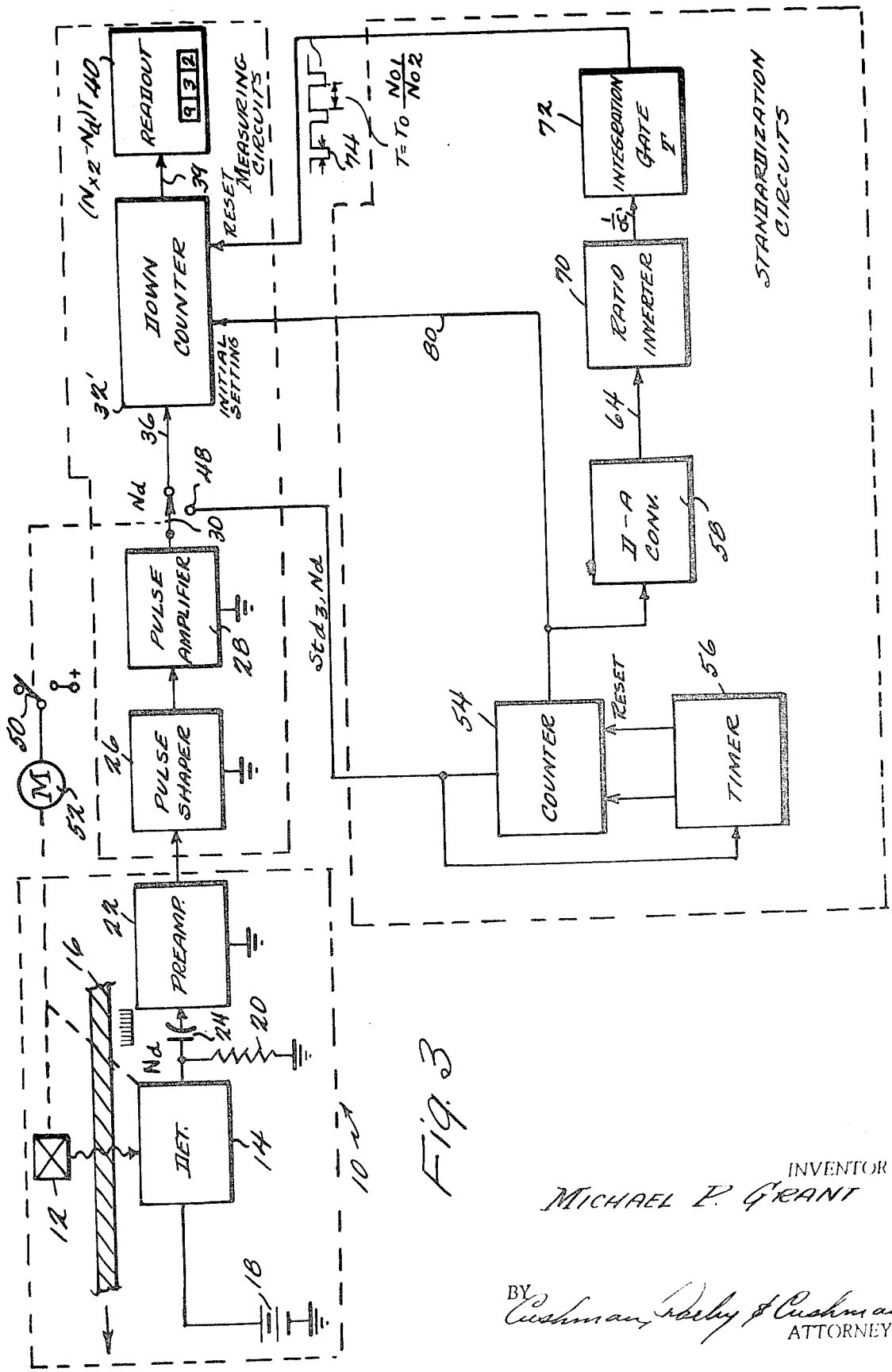
FIG. 3 is another block diagram showing a modification of the invention in which part of the analog circuitry is eliminated.

In FIG. 1, the source-detector assembly 10 includes a source 12 of any desired type of nucleonic pulse radiation and a radiation detector 14 which has the ability to detect and resolve individual pulse issuing from source 12. A sheet of material 16, which normally passes through the gauge in a lengthwise direction by means not shown, changes the amount of radiation received by detector 14. In this manner the weight per unit area of the material may be continuously gauged while it is moving. The material may be of any type, including paper, plastic, rubber, or any other material which is produced in sheet form. As above-indicated, if the density of the material is constant, then the output of detector unit 14 is effectively indicative of the thickness of the material.

Detector 14 is operated by a battery 18, and produces its pulses across a high megohm resistor 20. These pulses are of a random rate $N_d$, which is varied according to the instant thickness of material 16 as it passes through the radiation path. Within the source-detector assembly 10 is preferably a preamplifier 22, to which the developed pulses are coupled by condenser 24. The purpose of preamplifier 22 is mainly to match detector 14 to the electronics that follows the preamplifier. If desired, a pulse shaper 26 may be employed to cause the pulses from amplifier 22 to be of uniform height and equal width. Pulse amplifier 28, therefore, delivers to switch 30 random output pulses of uniform height and equal width at the $N_d$ rate.

PRovided in the pulse measuring circuit is a gated accumulating subtractor 32, which compares the pulse rate $N_d$ with the pulse rate from operating point generator 34, in a subtractive form. That is, accumulating subtractor 32, which can actually be a pulse subtractor followed by a separate accumulator, counts the $N_d$ pulses on its forward counting input line 36 and subtracts the pulses on its reverse counting input line 38, in a given period of time, termed a counting period, to provide a signal, such as a count on register 40, indicating the difference in pulse rates. Generator 34 issues operating point or reference pulses having a count rate denoted $N_{rz}$. As will be more apparent later, this reference pulse count rate causes zero suppression or a center scale operation in the readout. That is, when $N_d$ equals $N_{rz}$, the output on line 39 from the accumulating subtractor 32 is zero. This means that there is no count accumulated, and consequently the count inserted into digital readout register 40 is zero (000) during such times. Normally, however, there is either a positive or negative pulse output on line 39 during each period T, so that register 40 shows more or less than (000).

As is well known, measuring equipment of the general type described above needs standardizing periodically to compensate for changes in various factors which change the operation of the equipment. This includes not only changes in values of various elements such as resistors, condensers, amplifiers and the like, but mainly changes in the source-detector environment and source decay. That is, as the source decays or as extraneous material builds up on the detector or between the source and detector, the random pulse rate $N_d$ for a given thickness of material decreases. This is illustrated in the graph of FIG. 2. Assuming the equipment to be initially operative on absorption curve 42, the count rate from the detector at a material thickness $x$ is $N_{r1}$. However, if the source decays or extraneous material builds up between the source and detector, the equipment operates on a lower absorption curve, such as curve 44. In this case, the new count rate from the detector for the desired thickness $x$ is $N_{r2}$, a value lower than the initial desired rate $N_{r1}$. To compensate for the difference between $N_{x1}$ and $N_{x2}$, use is effectively made of the pulse rates $N_{o1}$ and $N_{o2}$ which occur at zero thickness of material between the source and detector and which show on the graph in FIG. 2 at the points where absorption curve 42 and 44 intersect the ordinate.

This invention eliminates storage and recurrent counting of the initial standardization pulse rate $N_{o1}$ as in the aforesaid Chope application. Instead, the new standardization pulse rate $N_{o2}$ is itself employed without any explicit comparison to the initial rate $N_{o1}$.

Both to set $N_{o1}$ in initial calibration and subsequently to obtain the new standardizing pulse rate $N_{o2}$, switch 30 is moved to its lower contact 48 in conjunction with the downward movement of motor switch 50, which energizes motor 52. This causes the source 12 and detector 14 to be moved as a unit sidewise relative to material 16, on a conventional carriage (not shown) to such a degree that they are "off sheet," i.e., none of material 16 is any longer in the radiation path between the source and detector. Alternatively, the measured material can be moved and the source and detector can remain stationary. Therefore, detector 14 looks directly at source 12, except for any extraneous material that has built up between the source and detector, and for which compensation is desired, along with compensation for source decay, etc., as previously explained. Motor 52 is energized preferably periodically, for example every one-half hour, to withdraw the source and detector off sheet, and to effect standardization.

When switch 30 is in its downward position, the pulse rate $N_d$ is then a standardizing pulse rate, and the pulses are delivered to counter 54 and also to a gating timer 56. As in the aforementioned Chope application, counting by counter 54 is prevented by timer 56 until such time as the source and detector are fully off sheet. Alternatively, timer 56 can be prevented from operating until a switch on the carriage is activated when the source and detector are "off sheet." Timer 56 may include, for example, a delay unit and an asymmetrical multivibrator which is triggered by a delayed pulse from the delay unit. In addition, timer 56 may reset counter 54 to zero at the beginning of each standardization period. Thereafter, timer 56 operates counter 54 for a predetermined length of time. Timer 56 may be adjusted to provide a counting time $t$ selected so that the initial count obtained on counter 54 will be proportional to an integral power of the base of the digital number system being used. For example, in a decimal system, the timer 56 is adjusted initially to provide a count on counter 54 of $tN_{o1}=10^n$. A typical time $t$ might be in the 1 to 10 second range, though limitation thereto is not intended. The output from counter 54 in a subsequent standardizing period will then be a decimal fraction of the original output and proportional to the new standardizing pulse rate $N_{o2}$. This new signal represents a digital count and converter 58 in the instantly described embodiment produces on line 64 a corresponding analog signal denoted $\alpha$ which is effectively equal to the ratio $N_{o2}/N_{o1}$. This ratio is indicative of the change of the absorption curve at zero absorber, i.e., when material 16 is not in the radiation path, both at initial calibration and at each standardization period thereafter. It can be shown simply that if the value of the absorption curve at zero thickness decreases a given percentage, then each point along the curve likewise decreases by the same percentage.

Pulse generator 34 is initially set to provide an output pulse rate of $N_{xt}$, which is the operating point on the initial absorption curve 42 in FIG. 2. In order to change the operating point from curve 42 to curve 44, the output pulse rate of generator 34 is decreased by the ratio $\alpha$ resulting in the analog output signal on line 64, by applying that output via line 66 to generator 34. This effectively multiplies the rate $N_{x1}$ by $\alpha$, which is the new standardized rate $N_{x2}$ applied to subtractor 32.

From FIG. 2, it can be seen that when the absorption curve drops to a new value, the pulse span $N_{s1}$ is reduced to a new pulse span $N_{s2}$. Thus, for a thickness span ranging from $x_a$ to $x_b$, there is a lesser number of counts available at switch 30, and therefore on line 36, to activate the accumulator and its associated readout. To compensate for this, the counting period or integration time T, which typically may be in the 0.1–1.0 second ranges (no limitation intended), is increased by the reciprocal of $\alpha$ i.e., by $1/\alpha$, which is the ratio $N_{o1}/N_{o2}$. This ratio is the inverse of the ratio employed to decrease the pulse rate from generator 34. To obtain this inverse ratio, the analog signal level on line 64 may be applied via line 68 to a ratio inverter 70, which may be an analog reciprocal divider for example. The resulting output of inverter 70 is applied to an integration gate 72 for multiplying the normal counting period $T_o$ by the ratio $N_{o1}/N_{o2}$. Gate 72 also provides a pulse 74 between the variable length counting periods T, to reset accumulator 32 and readout 40 to zero. Gate 72 may include a free running asymmetrical multivibrator, for example. Alternatively, gate 72 may be constructed in accordance with apparatus, for example, described in a copending application Ser. No. 545,499, filed Apr. 26, 1966, and commonly assigned with this application.

From the foregoing, it is apparent that accumulator 32 counts the difference in the number of pulses on lines 36 and 38 during each counting period T and readout 40 registers these pulses during that time to give a very accurate indication of the instantaneous thickness of the material being measured. With the operating point pulse rate being decreased by the ratio $\alpha$ and the counting periods increased by the inverse of that ratio, it is apparent that a highly reliable system is effected so that reproducibility of the same count in readout register 40 can be obtained for the same thickness of material passing between the source and detector, notwithstanding source decay or other environmental conditions such as extraneous material buildup between the source and detector.

While the foregoing description concerning FIG. 1 indicates that accumulator 32 is of the subtracting type so that it totals the difference between the detector pulse of line 36 and the operating point pulse on line 38, the accumulator may be of the additive type instead. That is, it may add the pulses on lines 36 and 38, in which case the sum thereof may be compared with a predetermined number in the accumulator 32 or readout 40. For example, readout 40 could be such as to read 000 when the sum is twice the number of operating pulses on line 38 during a given counting period, so that the numerical indication from readout 40 would again indicate the relative amount that the thickness of material 16 has deviated above or below the amount corresponding to the operating point pulse rate as then standardized. In like manner, the accumulating subtractor 32 and readout 40 may be designed in any other desired manner to count pulses and indicate changes in the material thickness.

FIGS. 1 and 2 and the foregoing description thereof have detailed a specific form of this invention as it includes two different types of standardization means for compensating for source decay, accumulation of dirt or the like on the source, and other source-detector environmental changes, along with changes in circuit components and values. In certain circumstances, such as when the range of thickness variations to be measured is normally smaller than presumed above, span standardization may not be necessary. That is, if desired, the equipment in FIG. 1 which varies the length of the counting periods T, could be eliminated, so that all counting periods are of equal length. In particular, the connection from converter 58 to integration gate 72 may be removed under those circumstances, while gate 72 is simplified because it no longer needs to be variable or adjustable. Otherwise, the circuitry may remain the same, with all of the required standardization being effected by varying the frequency or rate of the operating point pulses in the manner previously described.

Alternatively, the invention includes standardization by only regulating the length of the counting periods in accordance with the variations in the standardizing pulse rate. That is, in this form of the invention, the operating point pulse generator 34 and connections from converter 58 to accumulator 32, may be eliminated, while span standardization is retained so that the length of the counting periods continues to be regulated as previously described. In this embodiment, the accumulating subtractor 32 may be simplified to a gated or resettable counter which totals the detector output pulses on line 36 during each of its successive counting periods. This form of the invention will still compensate for source decay and buildup of foreign matter on the source, as well as other variables in the measuring circuit. In this case, a certain thickness of material 16 is represented by a particular pulse count. When the source decays or accumulates foreign matter, the pulse count is reduced and the gauge calibration is off, indicating a smaller thickness of material than actually present. Accordingly, this form of the invention compensates the thickness gauge for such variables by changing the count time so that the same number of pulses per unit of time can be counted. In other words, the length of the counting periods after successive standardizing times, is increased, if and as the source decays and/or has foreign material accumulated on it. All that is needed is to maintain this relationship, and the gauge will continuously readout the proper thickness.

In a broader sense, the present invention need not store a signal that is proportional to the initial standardization pulse rate, but instead subsequent standardizing pulse rates (stdz. $N_d$) are used to adjust the nucleonic system, to restore the readout signal to the calibrated value for a given value of the measured variable. In other words, the nucleonic systems reads out the same thickness value for a material thickness measured at calibration and subsequent thereto, even though the nucleonic system has changed in some way, such as through source decay. The adjustment may be accomplished by changing the operating point pulse rate $N_{x2}$ or the counting period, depending on which system is used. The subsequent standardizing pulse rates can be used to control the integrating or averaging time constant in generator 34 or gate 72, such as by adjustment of the capacitance and/or resistance in a parallel resistor-capacitor integrator or averager. Other forms of adjustment can be used, and the method can be performed by automatic, or hand adjustment of the operating point generator pulse rate, counting period, or integrating or averaging circuit time constant.

From the foregoing, it is apparent that this invention preserves the digital character or pulse nature of individual radiation "events" or "pulses" such as may be provided by beta or gamma radiation sources. Because of the digital nature of the system, the radiation detector and electronic circuits handling the pulses, must have high resolution and wide bandwidth.

Another embodiment of the invention in which no operating point pulse generator is needed is shown in FIG. 3. In this embodiment, the counter 32' is of the down counting type which has it count input connected to line 36. Initially count $tN_{o2}$ is set in on counter 32' by the digital signal on line 80 from counter 54. The reset signal for counter 32' is obtained as before from gate 72. This gate is operated in the same manner as explained above for FIG. 1. That is, the digital count signal from counter 54 is changed to an analog signal in converter 58, and that analog signal is then inverted to control the gating period T set by gate 72. Counter 32' therefore counts down from the standardized digital count set by counter 54 for each successive time period T. The down count of counter 32' is in response to the detector output pulses from pulse amplifier 28 which pulses are thereby directly combined with the standardized digital count signal. As before, the time period T is of variable length, and between these time periods are the pulses 74 during which readout 40 is updated. When counter 32' is reset by pulses 74, the digital count signal from counter 54 is operative to set its count back into counter 32', so that this counter may count down again during the next counting period T. It is apparent therefore that counter 54 retains its count from one standardizing time to the next. This may be accomplished by a buffer output as is well known.

As in the FIG. 1 arrangement, the system in FIG. 3 may be operated, if desired, without any change in the counting period from time to time, i.e., by elimination of the converter 58 and inverter 70, which would allow gate 72 to be simplified, as above discussed. Alternatively, in some instances, counter 32' may be of the type which is preset to a given number without the need of an input on line 80. This would allow the counter to count down from a given number each counting period T, while that counting period may be regulated in length in accordance with the last count signal provided by counter 54.

While FIG. 3 eliminates the pulse generator 34 of FIG. 1, FIG. 3 still employs analog circuitry in its reset channel. For a system in which this channel is also digital, reference may now be made to FIG. 4.

FIG. 4 also employs a down counter which is designated 32" since it not only is connected at its count input to line 36 and at its set input to line 80, but has start and stop inputs which are connected to lines 82 and 84, respectively. The count and set inputs on lines 36 and 80 are the same as described above relative to FIGS. 1 and 3. The digital count signal from counter 54 is applied not only over line 82 to counter 32", but also to digital inverter 86 the output of which sets another down counter 88 to a predetermined count generally corresponding to the inversion of the digital count signal from counter 54. When a control signal is received on line 90 from the counter control circuit 92, down counter 88 begins counting the pulses from clock pulse generator 94. When the counter 88 has counted the number of clock pulses equal to the count set into the counter via line 87, a signal issues on line 96 causing the counter control circuit 92 to apply a stop signal to down counter 32" over line 84 and a stop signal to down counter 88 over line 98.

During the time that down counter 88 was counting down, down counter 32" was also counting down from the digital count set thereinto over line 80. Then, when the stop signal was applied on line 84, counter 32" was read out over line 39 to read out 40'. As soon as this readout is completed, a signal issues on line 100 to cause control circuit 92 to restart down counters 32" and 88 by a start signal on lines 82 and 90. Both counters start counting down again from their respective counts set into them from counter 54 and digital inverter 86. It is apparent therefore that in this embodiment, the time that it takes counter 88 to count down from the count set into it by the signal on line 87 is the counting interval T previously referred to in FIGS. 1 and 3. This counting interval is the same for each count down of counter 88 during the current measuring time and until a new digital count signal is developed by counter 54 during a succeeding standardization time.

Counter control circuit 92 in FIG. 4 may be a flip-flop which has two set inputs 96 and 100 and corresponding outputs as is well known.

Initially in standardization, counter 54 is set to a power of 10, such as $10^n$. At subsequent standardizations, counter 54 reads $10^n \alpha$. This digital value is fed as an initial setting into the down counter 32".

To control the integration time, the $10^n \alpha$ digital signal is converted to its inverse by inverter 86 which need operate over a range $0.9 < \alpha < 1.0$ or so. Inverter 86 may be a stored logic table as indicated below. The digital signal $10^n/\alpha$ on line 87 is used as the initial setting of down counter 88 which is counted down at a fixed rate by clock pulse generator 94. When down counter 88 reaches zero, counter control 92 stops down counter 32" and resets down counter 88.

After readout on unit 40' is completed, counter control 92 resets down counter 32" and restarts counter 88 and 32" for the next scan of data. Note that down counter 88 restarts at a $10^n/\alpha$ from the stored table and the most recent standardization.

The other elements of FIG. 4 are well known, though a word may be said concerning digital inverter 86. In order to have an appropriate initial setting for down counter 88, a signal on line 87 should represent an integer which has an accuracy similar to that for the input count from counter 54. In other words, a dividend must be chosen to create integers and no fractions of similar accuracy for the input. Several straightforward realizations of inverter 86 are possible, as well known to one of ordinary skill in the art. For example, use may be made of a standard digital division circuit in which the input is subtracted from a number such as $1\times10^{2n}$ (for the decimal number system illustrated) until the result is negative. The output signal on line 87 is indicative of the number of subtractions.

An alternative approach to implementing digital inverter 86 is the use of a stored table in diode logic, for example. It is to be noted that in FIG. 4 embodiment, as well as the FIGS. 1 and 3 embodiments, that the digital count signal $tN_{o2}$ from counter 54 does not vary more than about 10 percent at any standardization time from its original amount at calibration of the system. Therefore, a stored table approach is possible. As an example, assume the input signal varies from 90 to 99 and that the output signal from inverter 86 needs to be accurate to two places. Inverter 86 could then be internally connected in a stored table arrangement representing conversion of the 90–99 values to 111–101, respectively. That is, assuming the input and output signals for inverter 86 are of the BCD (Binary Coded Decimal) notation, the outputs of BCD-decimal converters at the input to inverter 86 can be cross-connected appropriately to the inputs of the output decimal-BCD converters in order to effect the desired inversion and number conversion according to the stored table arrangement. For example, a BCD input signal representing the decimal number 93 would be converted to an output BCD signal representing the number 108 in accordance with the above table. Extension of this stored table arrangement for greater accuracy will be apparent to one of ordinary skill in the art.

In the FIG. 4 arrangement, it may be desirable to scale the pulses from shaper 26, in which event readout 40' could be directly in units of thickness, density, or weight per unit area, for example 80 mils might have a readout of 8,000 counts. The same arrangement may be used with the FIGS. 1 and 3 embodiments also, if desired.

Since FIG. 4 represents an all digital arrangement, no analog inaccuracies are present, with the possible exception of the clock pulse rate from generator 94, but obviously that generator can produce a rather accurate rate in accordance with well-known techniques.

As in FIGS. 1 and 3, the FIG. 4 embodiment may be modified so that the down counter 32" is operated only by the digital equipment in the timing channel including counter 88 with counter 32" being of the type which automatically resets to a predetermined count upon receipt of a start signal on line 82 without line 80 being connected to the counter. Alternatively, line 80 may be used to convey the standardized digital count signal to counter 32"', while digital inverter 86 is eliminated and counter 88 automatically resets itself to a predetermined count from which it counts down upon receiving a start signal over line 90.

A digital computer may be wired or programmed to store, direct, and otherwise perform the required functions or arithmetical operations on the output data pulses provided by the radiation detector, in accordance with the present invention.

Thus, it is apparent that this invention has provided for all of the objects and advantages hereinbefore mentioned. Still other objects and advantages, and even further modifications of the invention will become apparent to those of ordinary skill in the art upon reading the foregoing disclosure, but this disclosure is to be interpreted as illustrative and not as limitative, the scope of the invention being defined by the appended claims.

What is claimed is:

1. In a nucleonic material measuring system of the type that has means for establishing a nucleonic radiation path including a nucleonic source and detector unit, wherein the material moves through said path during a measuring time and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:
    means operative during said standardizing time for counting said detector output pulses for a predetermined interval to provide a standardized digital count signal, and
    means operative during successive time periods for directly combining said digital count signal and said detector output pulses during said measuring time to provide a standardized indication of the measure of said material during each such period.

2. A system as in claim 1 and further including means for regulating the length of said successive time periods inversely in accordance with said standardized digital count signal.

3. A system as in claim 2 wherein said combining means includes second counting means responsive both to said digital count signal directly and to said output pulses during said measuring time,
    said means for regulating the length of the successive time periods including:
    gating means for resetting said second counting means at the end of each said time period, and
    means operative on said digital count signal for converting same to an inverted analog signal for controlling the said gating means as to the length of said successive time periods.

4. A system as in claim 2 wherein said combining means includes second counting means operative directly on said digital count signal and said detector outputs during a measuring time, and wherein said means for regulating the length of the successive time periods includes digital means operating on said digital count signal to start and stop said second counting means at intervals determined by the count represented by the digital counting signal.

5. A system as in claim 4 wherein said digital means includes;
    means for generating clock pulses
    third counting means for combining said digital count signal and said clock pulse, and
    counter control means for stopping said second and third counting means when the latter counts the number of clock pulses represented by said digital count signal and for thereafter restarting said second and third counting means.

6. In a nucleonic material measuring system of the type that has means for establishing a nucleonic radiation path including a nucleonic source and detector unit, wherein the material moves through said path during a measuring time and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:
    means operative during said standardizing time for counting said detector output pulses for predetermined interval to provide a standardized digital count signal, and
    means for directly combining said digital count signal and said detector output pulses during a measuring time to provide a standardized indication of the measure of said material.

7. A system as in claim 6 wherein said combining means includes a down counter which is set at a count represented by said digital count signal and which counts down the detector output pulses during measuring times to provide said standardized indication of the material measured.

8. In a nucleonic material measuring system of the type that has means for establishing a nucleonic radiation path including a nucleonic source and detector unit, wherein the material moves through said path to be measured and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:

means operative during said standardizing time for counting said detector output pulses for a predetermined interval to provide a standardized digital count signal, second counting means operative during successive time periods for counting the said detector output pulses during said measuring time, and means for modifying the length of said successive time periods inversely in accordance with said standardized digital count signal to provide from said second counting means a standardized indication of the measure of said material during each such time period, said modifying means including a digital-to-analog converter responsive only to said standardized digital count signal for producing an analog signal directly proportional thereto for controlling the length of said time periods.

9. In a nucleonic material measuring system of the type that has means for establishing a nucleonic radiation path including a nucleonic source and detector unit, wherein the material moves through said path to be measured and then causes an output from the detector of pulses having rates or recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:

means operative during said standardizing time for counting said detector output pulses for a predetermined interval to provide a standardized digital count signal, digital-analog conversion means responsive only to said standardized digital count for changing said digital count signal to a corresponding analog signal directly proportional thereto, second counting means, means for generating reference pulses, gating means for respectively resetting said second counting means at the end of successive time periods, said second counting means being operative during each of said successive time periods for combining said reference pulses and the detector output pulses during said measuring time, and means coupling said directly proportional analog signal from said conversion means to at least one of said generating and gating means to cause the said second counting means to provide a standardized indication of the measure of said material during each of the said successive time periods.

10. A system as in claim 9 wherein said conversion means is coupled to both said generating means and gating means to cause the said reference pulses to be directly proportional to said standardized digital count signal and to cause the successive time periods effected by said gating means to be inversely proportional to that digital count signal.

11. A nucleonics radiation gauge comprising a source and radiation pulse detector whose measurement of a single physical variable depends upon the average count rate of radiation pulses measured at said detector, said nucleonics radiation gauge further comprising:

down counting means for counting output pulses from the radiation detector down from a preset count for a predetermined counting period, and means for modifying said preset count in accordance with changes in the radiation pulse rate caused by extraneous changes in variables other than the measured variable for causing the totalized count of pulses for each counting period to be at least substantially equal to the total pulses determined for a given value of the measured variable at the time of original radiation gauge calibration.

12. A nucleonic device for measuring the density and/or the thickness of material, comprising:

means for providing a nucleonic radiation path including a radiation source and a radiation detector, means for causing said material to be in said path during measurement thereof and out of said path at other times, means for counting down from a preset count a total of pulses related to the radiation reaching the detector from the material during each predetermined counting period, and means for modifying the count down in accordance with the detected radiation when the material is out of the path to cause the resulting count to be substantially the same each counting period for a given measurement of said material regardless of the amount of radiation then detected, the detected radiation being dependent on various factors including the amount of source decay and the amount of foreign matter between the source and the detector.

13. A device according to claim 12 wherein said modifying means is effective to modify said count down by modifying the said preset count in accordance with changes in the radiation detected at a later time while the material is out of the path.

14. A device according to claim 13 in which the time of said counting period is also varied by said modifying means to modify the said count down.

15. In a nucleonic measuring system in which a property such as thickness or density of a material is measured by subjecting the measured material to radiation from a nucleonic radiation source and by detecting the resulting radiation received at a radiation pulse detector after said radiation has interacted with the said measured material, said material being removable from said source and detector at predetermined times in order to determine the radiation received at said detector for the condition in which the measured material no longer interacts with the radiation and in which the detected radiation pulse rate depends only on nonmaterial factors such as foreign material between the source and detector and the source strength existing at a given time, means operative during successive counting periods for counting pulses issuing from the radiation pulse detector down from a preset count so as to provide an output reading of the measured characteristic in terms of the number of pulses received by the detector during each counting period, and means for determining the required length of said counting periods and for changing the said length thereof in accordance with said radiation received when said measured material no longer interacts therewith and in such a manner that the remaining count in said counting means at the end of each counting period is substantially equal to the count therein for a respective value of measured characteristic determined during the original calibration of the measuring system.

16. Apparatus as in claim 15 wherein the said means for determining the necessary length of said counting periods includes time gating means for periodically resetting the preset count in said counting means and means for increasing the length of the said counting periods as the detected radiation pulse rate decreases due to nonmaterial characteristics such as foreign material between the source and detector, changes in source strength, and changes in efficiency of the radiation pulse detector.

17. A nucleonic material measuring system of the type comprising means for establishing a nucleonic radiation path including a nucleonic source and detector unit, wherein the material moves through said path during a measuring time and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:

means operative for counting said detector output pulses for a predetermined interval within said standardizing time to derive an indication of a standardized digital count and for directly combining said digital count with said detector output pulses during said measuring time to provide a standardized indication of the measure of said material.